Aug. 2, 1960
A. W. VANCE
2,947,481
TRIGONOMETRIC FUNCTION RESOLVER
Filed March 23, 1950
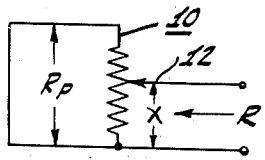
Fig.1.
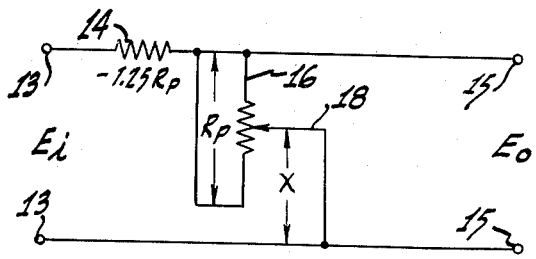
Fig.2.
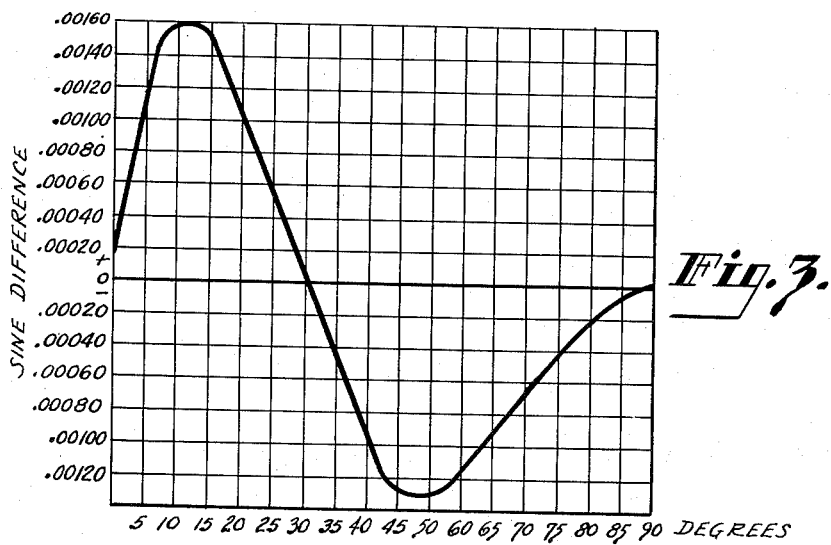
Fig.3.
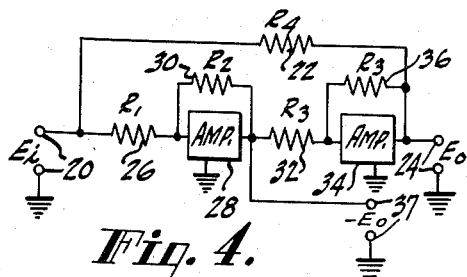
Fig.4.
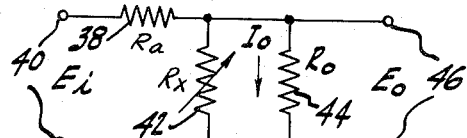
Fig.5.
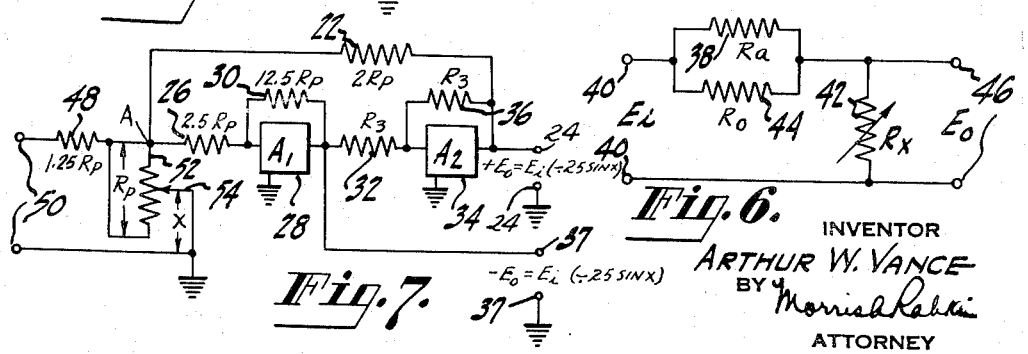
Fig.6.
Fig.7.
INVENTOR
ARTHUR W. VANCE
BY
ATTORNEY

United States Patent Office 2,947,481
Patented Aug. 2, 1960

2,947,481

TRIGONOMETRIC FUNCTION RESOLVER

Arthur W. Vance, Union Valley, N.J., assignor, by mesne assignments, to the United States of America as represented by the Secretary of the Navy Filed Mar. 23, 1950, Ser. No. 151,443

6 Claims. (Cl. 235—186)

This invention relates to electrical trigonometric function resolvers. More particularly the present invention is an improved circuit for providing an electrical output which is a function of an angle.

Presently known methods for obtaining an electrical output, which is a function of an angle, consist of using angle resolvers or specially tapered potentiometers. Angle resolvers are costly. Tapered potentiometers are also costly. Great care must be taken in their manufacture. For example, if a sine or cosine function is desired, then a potentiometer winding card is cut so as to nearly form the desired function and then the cards are bent or crinkled in the grooves at a number of points to further correct for any deviation from the desired function. Linear wound potentiometers are relatively inexpensive, are highly accurate and can be obtained in small, convenient multiturn forms.

It is an object of the present invention to provide an improved trigonometric function resolver using a linear potentiometer.

It is another object of the present invention to provide a more inexpensive trigonometric function resolver than those known heretofore.

It is a further object of the present invention to provide an improved trigonometric function resolver that is simpler to manufacture than those known heretofore.

These and further objects are achieved in the present invention by providing a network comprising a series negative resistance and a shunt shorted linear potentiometer. One end of the shorted linear potentiometer and the movable arm of the potentiometer provide the output for the network. By selecting the value of the negative resistance to have a definite relationship to the unshorted value of the resistance of the potentiometer winding, an electrical output may be obtained from the network which varies as a trigonometric function of the angle through which the potentiometer movable arm is moved.

Other objects and features of the invention, as well as the invention itself, will be apparent from the following description when read in connection with the drawings, in which, Figure 1 is a circuit diagram of a shorted potentiometer, which is shown in order to illustrate the derivation of certain basic relationships.

Figure 2 is a circuit diagram which illustrates the basic requirements of an embodiment of the present invention.

Figure 3 is a curve showing the difference between a true sine function and the transmission characteristics of the network shown in Figure 2.

Figure 4 is a circuit diagram of a network which effectively provides a negative resistance.

Figures 5 and 6 are circuit diagrams of equivalent networks, a showing of which is required for illustrating certain relationships.

Figure 7 is a circuit diagram of a preferred embodiment of the invention.

Referring now to Figure 1, if $R_\rho$ represents the total unshorted resistance of a linear wound potentiometer 10 and if $x$ represents the resistance from the contact point of the movable arm 12 to the lower end of the potentiometer, the resistance R, seen when looking at the potentiometer between the movable arm and one end, is $$R = \frac{x(R_\rho - x)}{R_\rho}$$

This is the equation of a parabolic function. This function differs from a sine wave function by about 5.65%.

Referring to Figure 2, a circuit is shown wherein a negative resistance 14 is connected in series with a pair of input terminals 13. A shorted linear wound potentiometer is connected across a pair of output terminals 15 with one end of the winding connected to the side of the line in which the series negative resistance is connected and the movable arm 18 connected to the other side of the line. Effectively, a voltage divider is provided wherein the negative resistance 14 is in series with the shorted potentiometer 16 and an output voltage $E_o$ is taken from the potentiometer movable arm and the junction of the potentiometer with the negative resistance. Using the same designations as were used in Figure 1, the ratio of the input voltage $E_i$ to the output voltage $E_o$, where a value for the negative resistance of $-1.25\ R_\rho$ is selected, is $$\frac{E_o}{E_i} = \frac{x(R_\rho - x)}{x(R_\rho - x) - 1.25 R_\rho^2}$$

Using this formula, and a proper scale factor, it can be shown that, for substantially the range of the movable potentiometer arm (varying values of $x$) the transmission characteristics of the network shown in Figure 2 matches a sine wave function after multiplication by this scale factor to .16% or 1/625. This difference was plotted and is shown as the curve in Figure 3. $R_\rho$ in this instance was made equal to 1.80 so that the $x$ scale would watch the degree scale used in trigonometric tables. It should be noted that the difference function shown is relatively small and smooth. The scale factor is determined as follows:

Let $x = yR_p$ where $y$ is the fraction of $R_p$ which $$x \text{ represents or } y = \frac{x}{R_p}$$

Substituting $$\frac{E_o}{E_i} = \frac{yR_p(R_p - yR_p)}{yR_p(R_p - yR_p) - 1.25 R_p^2} = \frac{y(1-y)}{y(1-y) - 1.25}$$

The total rotation of any potentiometer used in this system corresponds to 180°

Now if for $y$ there are substituted values such as 1/6, 1/3, 1/2, 2/3, etc., respectively corresponding to 30°, 60°, 90°, 120°, etc. of rotation of the potentiometer shaft, considering the total shaft rotation as 180°, the respective values of $$\frac{E_o}{E_i}$$

will be found to be $-.125$, $-.216$, $-.25$, $-.216$, etc. It will be readily observed that if any of these values is multiplied by 4, the proper value of the sine of the angle is matched. The scale factor here is then 4 since the ratio of the output to the input voltage subtantially equals $-0.25 \sin x$.

Figure 4 represents a circuit which may be used for obtaining the effect of a negative resistance. By means of feedback amplifier networks negative resistances of great stability may be realized. (Such resistances will of course be unstable if they are not connected with positive resistances so that the total effective resistance is still positive.) In Figure 4 a voltage $E_i$ is impressed upon a pair of input terminals 20. A resistance 22, having a value $R_4$, connects one of the input terminals 20 with one of a first pair of output terminals 24. A series resistor 26, having a value $R_1$, connects one of the input terminals 20 to the input of a first amplifier 28, represented by a rectangle. A resistor 30, having a value $R_2$, is a negative feedback resistor and connects the output to the input of the first amplifier 28. A resistor 32, having a value $R_3$, connects the output of the first amplifier 28 to the input of a second amplifier 34, also represented as a rectangle. The output of the second amplifier 34 is connected to the first pair of output terminals 24 and is also connected with its input by means of a negative feedback resistor 36, also having a value $R_3$. The output from the first amplifier 28 is also connected to a second pair of output terminals 37.

The first and second amplifiers 28, 34 are similar, each having a gain and phase versus frequency characteristic such as to permit its use with negative feedback without being unstable. Each of the amplifiers also has a very high gain at the operating frequency. These types of amplifiers are well known in the art. It can be shown that for an amplifier having an input resistor and a negative feedback resistor the ratio of output to input voltages varies as the ratio of the feedback resistor to the input resistor. In the circuit shown in Figure 4, the ratio of the output to the input voltages is $$\frac{E_0}{E_i} = \frac{R_2}{R_1} \cdot \frac{R_3}{R_3} = \frac{R_2}{R_1}, \quad E_0 = \frac{E_i R_2}{R_1}$$

The current $I_1$, in resistor $$R_1 = \frac{E_i}{R_1}$$

The current $I_4$, in resistor $$R_4 = \frac{E_i - E_0}{R_4}$$

$$\therefore I_4 = \frac{E_i}{R_4} - \frac{E_i R_2}{R_1 R_4}$$

The input current $I_i = I_1 + I_4$ $$\therefore I_i = \frac{E_i}{R_1} + \frac{E_i}{R_4} - \frac{E_i R_2}{R_1 R_4}$$

$$I_i = E_i \left[ \frac{R_4 + R_1 - R_2}{R_1 R_4} \right]$$

The input impedance $R_i$ to the circuit is $$R_i = \frac{E_i}{I_i} = \frac{E_i}{E_i} \left( \frac{R_1 R_4}{R_4 + R_1 - R_2} \right)$$

$$\therefore R_i = \frac{R_1 R_4}{R_4 + R_1 - R_2}$$

It now becomes evident that $R_i$ can be made either positive, negative or infinity as desired by adjusting the relative values of the resistances $R_1$, $R_2$ and $R_4$.

Figures 5 and 6 are a pair of equivalent circuit diagrams which are presented to show how the negative resistance amplifier network of Figure 4 may be inserted in Figure 2. Referring to Figure 5, a first resistor 38 of value $R_a$ is connected to one of a pair of input terminals 40, a variable shunt resistor 42, varying over a resistance range $R_x$, is connected from the resistor 38 to the other of the pair of input terminals 40. Another resistor 44 having a value $R_o$ is connected in parallel with the resistor 42. A pair of output terminals 46 are connected to the parallel connected resistors 42, 44.

In Figure 6 there is represented a resistance in which the resistors 38 and 44 are connected as a pair of paralleled series resistor arms and the resistor 42 is connected as a shunt variable resistance arm $R_x$.

It can be shown by Thevenim's theorem that the variation of the output voltage $E_o$ with variations of $R_x$ is of the same form for each of the circuits represented in Figures 5 and 6, although the real absolute factors may differ. In Figure 5 the current through resistor $R_o$ varies with $E_o$. Considering Figure 6, if $R_o$ is made negative and lower in value than $R_a$ the combination is negative and the effective driving resistance can be negative. Figure 6 can then be considered equivalent to Figure 2 as well as Figure 5. Using the principles herein set forth a negative resistance may be provided for Figure 2.

Figure 7 is a circuit diagram of an embodiment of the invention. Also shown in Figure 7, by way of example, are one set of resistance ratios which provide an approximation of a sine wave function for the circuit shown to the same degree as is provided by the circuit shown in Figure 2. In Figure 7, an input resistance 48 is connected between one of a pair of input terimnals 50 and one side of a shorted linear wound potentiometer 52. The movable arm 54 of the potentiometer is connected to the other of the input terminals 50 and to ground. The circuit shown to the right of the junction point, identified as point A, of the input resistor and the potentiometer is the amplifier network shown in Figure 4 and its components are similarly identified. This circuit effectively acts as a negative resistance. The circuit shown in Fig. 7 is the equivalent of the circuit shown in Fig. 5, wherein the $R_o$ resistor 44 is negative and represents the input resistance of Fig. 4, which is shown as $R_i$ in the formulas previously derived. The $R_x$ resistor 42 in Fig. 5 is representative of the resistance between the movable arm and the upper end of the shorted potentiometer. The $R_a$ resistor 38 of Fig. 5 is represented in Fig. 7 by the input resistor 48.

The set of resistance ratios shown in Figure 7 is not the only one that affords substantially a sine function. Any arrangement, whereby the effective input impedance of the amplifier network is negative by an amount that, in parallel with the input resistance, results in an effective input resistance of substantially 1.25 times the resistance of the potentiometer winding, will provide a result that closely approximates a sine function. The resistance from junction point A is always positive (for the ratio values shown this is $+0.3125 R_\rho$). Therefore, the circuit is stable even though there may be some positive feedback in the amplifier circuit.

The circuit shown in Figure 7 may also provide a cosine function by using the relationship $$\cos x = \sin(x + 90°)$$

The shaft rotation of the potentiometer may be calibrated in degrees or radians. As shown in Figure 7, two output voltages are provided with this apparatus, one $$E_o = E_1(-.25 \sin x)$$

and the second $-E_o = E_1(-.25 \sin x)$. The full range of the potentiometer covers 180 degrees. Therefore, one output can be considered as proportional to the sine of angles from zero to 180 degrees and the other output can be considered as proportional to the sine of angles from 180 degrees to 360 degrees. Alternatively, the outputs may be considered as ± sine of an angle. Where the sine functions are required for angles less than 180 degrees, the unused portion of the potentiometer may be replaced by a fixed resistor and the full range of the potentiometer may be used for obtaining the range of the angles. If desired, by subsequent amplification correction for the scale factor may be obtained.

Since the cost of linear potentiometers rises rapidly for accuracies greater than 0.1%, from a cost standpoint, it may be more economical to compensate for a deviation from a true sine function by using an adjustable cam to make up the difference by mechanically varying the coupling between an input shaft and the position of the potentiometer movable arm. If desired, the potentiometer winding card may be "crinkled" to provide some required compensation.

Although the voltage divider system of a negative resistance and a shorted potentiometer has been described and shown herein for generating a sine function by the selection of a certain ratio of the negative resistance to the resistance of the open potentiometer, this should not be construed as a limitation, since by the selection of different ratios other desired types of quadratic functions varying with rotation of the potentiometer movable arm may be generated. Departure of the potentiometer winding from the linear can be used to provide still other useful relationships.

There has therefore been shown and described herein a simple, novel and inexpensive trigonometric function resolver which permits the use of a linear potentiometer therein. While a single embodiment of the present invention has been shown and described, this is to be taken as illustrative and not as limiting.

What is claimed is:

1. A trigonometric function resolver comprising an effective negative resistance, a potentiometer having a movable arm, short-circuiting means connecting both ends of said potentiometer winding, one of said potentiometer winding ends being connected to said effective negative resistance, means to apply an input to said negative resistance and said potentiometer movable arm, and means to derive an output from said potentiometer winding one end and said movable arm which is a function of the resistance of said potentiometer winding between said movable arm position and said potentiometer winding other end.

2. A trigonometric function resolver as recited in claim 1 wherein said potentiometer has a linear winding.

3. A trigonometric function resolver as recited in claim 1 wherein said potentiometer has a linear winding and said effective negative resistance has a negative resistance value which is of the order of 1.25 times the value of said potentiometer winding resistance.

4. A trigonometric function resolver as recited in claim 1 wherein said effective negative resistance includes a first and a second amplifier each having an input and an output, a first input resistor having one end connected with said first amplifier input, a feedback resistor connected between said first amplifier output and input, a second input resistor connected between said first amplifier output and said second amplifier input, a second feedback resistor connected between said second amplifier output and input, said second feedback resistor and input resistor having equal resistance values, and a third resistor connected between the other end of said first input resistor and said second amplifier output.

5. A trigonometric function resolver comprising a first resistor, a linear wound potentiometer having a movable arm, short-circuiting means connecting both ends of said potentiometer winding, one end of said first resistor and one end of said potentiometer winding being connected together to form a junction point, a first and a second amplifier each having an input and an output, a first input resistor coupled between said junction point and said first amplifier input, a feedback resistor coupled between said first amplifier input and output, a second input resistor connecting said first amplifier output and said second amplifier input, a second feedback resistor coupled between said second amplifier output and input, a third resistor coupled between said junction point and said second amplifier output, means to impress an input upon said first resistor and said potentiometer movable arm, and means to derive an output of one polarity from said first amplifier output and an output of an opposite polarity from said second amplifier output, both said outputs being functions of the position of said movable arm.

6. A trigonometric function resolver as recited in claim 5 wherein said potentiometer has a linear winding and the effective input impedance of the circuit including said first and second amplifiers as seen from said junction point when computed as a resistance in parallel with said first resistor is an effective negative resistance having a value substantially equal to 1.25 times the resistance of said potentiometer winding, whereby each of said outputs varies proportionally to a sine function with changes in position of said potentiometer movable arm.

No references cited.